US012404200B2

(12) United States Patent
Dupeux et al.

(10) Patent No.: US 12,404,200 B2
(45) Date of Patent: Sep. 2, 2025

(54) HIGH-EFFICIENCY FURNACE

(71) Applicant: SAINT-GOBAIN ISOVER, Courbevoie (FR)

(72) Inventors: Guillaume Dupeux, Paris (FR); Antony Vispo, Les Ageux (FR); Alexandre Martin, Montlignon (FR); Sébastien Chesnel, Angouleme (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 318 days.

(21) Appl. No.: 17/920,230

(22) PCT Filed: Apr. 26, 2021

(86) PCT No.: PCT/FR2021/050720
§ 371 (c)(1),
(2) Date: Oct. 20, 2022

(87) PCT Pub. No.: WO2021/219952
PCT Pub. Date: Nov. 4, 2021

(65) Prior Publication Data
US 2023/0202899 A1 Jun. 29, 2023

(30) Foreign Application Priority Data
Apr. 30, 2020 (FR) .................................. 2004299

(51) Int. Cl.
C03B 5/235 (2006.01)
C03B 5/43 (2006.01)
(Continued)

(52) U.S. Cl.
CPC ............. *C03B 5/2356* (2013.01); *C03B 5/43* (2013.01); *C03B 37/011* (2013.01); *F27B 3/205* (2013.01);
(Continued)

(58) Field of Classification Search
CPC ................... C03B 5/2356; C03B 2211/22–23
See application file for complete search history.

(56) References Cited

U.S. PATENT DOCUMENTS 2,869,856 A * 1/1959 Greene ............... F27B 17/0033
432/83
3,266,789 A 8/1966 Georges et al.
(Continued)

FOREIGN PATENT DOCUMENTS

CN 110981164 A * 4/2020 ............... C03B 5/00
KR 100890808 B1 * 3/2009 ............... C21C 5/42
(Continued)

OTHER PUBLICATIONS

International Search Report as issued in International Patent Application No. PCT/FR2021/050720, dated Sep. 22, 2021.

*Primary Examiner* — Erin Snelting
(74) *Attorney, Agent, or Firm* — Pillsbury Winthrop Shaw Pittman LLP

(57) ABSTRACT

An installation for melting a composition of raw materials, suitable for obtaining glass wool, textile glass yarns and/or flat glass, includes a melting chamber equipped with at least one submerged burner, wherein the melting chamber is defined by side walls made of refractory material and a bare metal bottom traversed by a network of pipes adapted for the circulation of a cooling fluid.

15 Claims, 2 Drawing Sheets

(51) Int. Cl.
    *C03B 37/01*      (2006.01)
    *F27B 3/20*       (2006.01)
    *F27D 99/00*      (2010.01)

(52) U.S. Cl.
    CPC ...... *F27D 99/0033* (2013.01); *C03B 2211/22* (2013.01); *F27D 2099/0036* (2013.01)

(56) References Cited

U.S. PATENT DOCUMENTS

| | | | |
|---|---|---|---|
| 3,498,779 A * | 3/1970 | Hathaway | C03B 5/16 |
| | | | 65/327 |
| 3,947,002 A * | 3/1976 | Frech | C21C 5/44 |
| | | | 266/281 |
| 4,036,481 A * | 7/1977 | Pearce | C21C 5/48 |
| | | | 266/222 |
| 10,759,688 B2 * | 9/2020 | MacPhee | C03B 5/2356 |
| 2015/0175464 A1 * | 6/2015 | Lefrere | F27B 3/045 |
| | | | 65/135.1 |

FOREIGN PATENT DOCUMENTS

| WO | WO 2009/091558 A1 | 7/2009 | |
|---|---|---|---|
| WO | WO-2019106309 A1 * | 6/2019 | ............. C03B 5/235 |

* cited by examiner

[Fig. 1]
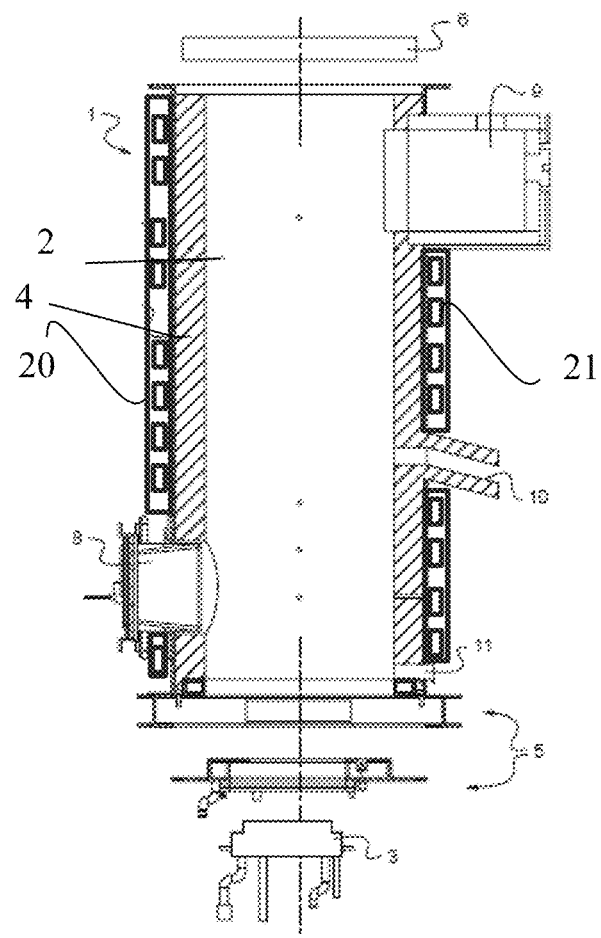
[Fig. 2]
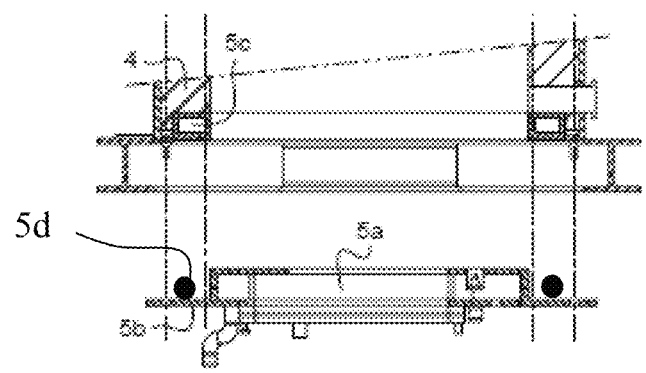

[Fig. 3]
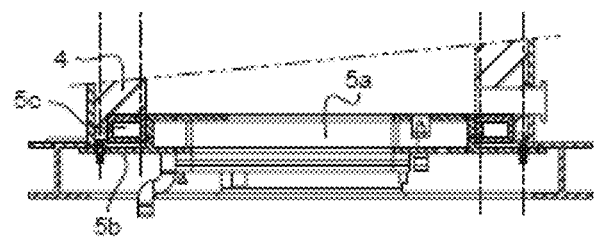

HIGH-EFFICIENCY FURNACE

CROSS-REFERENCE TO RELATED APPLICATIONS

This application is the U.S. National Stage of PCT/FR2021/050720, filed Apr. 26, 2021, which in turn claims priority to French patent application number 2004299 filed Apr. 30, 2020. The content of these applications are incorporated herein by reference in their entireties.

The present invention relates to an installation for melting a composition of raw materials suitable for obtaining glass fibers of the mineral wool type for thermal or sound insulation, so-called reinforcing textile glass yarns, and/or flat glass.

In this text, "raw materials" encompass silica sand, but also all additives (sodium carbonate, limestone, dolomite, alumina, etc.), waste materials (including mineral fibers) that may be produced from the production of said fibers or from construction or deconstruction sites, all possible liquid or solid fuels (composite or non-composite plastics, organic materials, coals), and any type of cullet. Also included are recyclable materials containing combustible (organic) elements such as, for example, sizing mineral fibers with a binder (of the type used in thermal or acoustic insulation or those used in the reinforcement of plastics), glazings laminated with sheets of polyvinyl butyral polymers such as windshields, glass bottles (household cullet), or any type of "composite" material combining glass and plastic materials such as certain bottles. "Glass-metal composites or metal compounds" such as functionalized glazings with metal-containing coatings can also be recycled. Until now, they have been difficult to recycle because this could lead to the melting chamber being gradually loaded with metals, resulting in the production of silicon metal in the glass melt. However, the stirring imposed by the melting process according to the invention makes it possible to avoid this sedimentation, and thus to recycle, for example, glazings coated with enamel layers, metal layers and/or various connector elements. In the description, the terms "liquid glass" and "glass melt" refer to the product of the melting of these vitrifiable materials.

The invention relates more particularly to a so-called "submerged-burner" installation (furnace). Such burners are fed with gas and air, and are generally arranged so that they are flush with the bottom of the melting chamber, so that the flame develops within the mass of raw materials being liquefied. These burners can be such that their gas supply lines are flush with the wall through which they pass. According to some embodiments, it is also possible to choose to inject only the gases resulting from combustion, the combustion being carried out outside the melting chamber itself.

In this context, it is known to use submerged-burner furnaces whose bottom and side walls are made of refractory materials.

Throughout the description, and in accordance with ISO/R836 or AFNOR NF B 40-001 standards, "refractory" materials are defined as materials and products other than metals and alloys (without excluding those containing a metallic ingredient), whose pyroscopic resistance is equivalent to at least 1500° C. This definition means that refractory materials must withstand at least 1500° C. without softening or collapsing under their own weight according to the pyroscopic strength test standard.

The advantage of refractory walls and bottoms is that they offer very good thermal insulation, and therefore reasonable energy consumption. However, they have the disadvantage of being fragile and not very adaptable. For example, the inclusion and securing of various elements on the bottom (burners, bubblers) is made difficult by the thickness of the refractory, which is on the order of 20 to 40 centimeters.

It should also be noted that submerged-burner furnaces with such refractory walls are not suitable for rock wool production. Melting rock (basalt or blast furnace slag) requires heating the raw materials to temperatures around 1500° C., which are significantly higher than for melting ordinary glass, and which conventional refractories have difficulty withstanding. Add to this a very strong agitation of the molten rock bath, due to the arrangement of the burners under the surface thereof, and a greater fluidity of the molten rock, compared to molten glass. These different factors contribute to accentuating corrosion mechanisms on the furnace walls.

Certainly, there are high performance refractories that can withstand such physical stresses for a while. However, the very high costs associated with the use of such refractories prohibit any use of them for the production of rock wool, via submerged-burner furnaces.

For all these reasons, submerged-burner furnaces with refractory walls are not suitable for melting rock wool.

According to an alternative approach, it is known to use submerged-burner furnaces wherein the side walls and the bottom are made of metal plates with a network of pipes adapted for the circulation of a cooling fluid (called a "water jacket"). Such metal plates have the advantage of being easily removable and replaceable and have a long life when in contact with hot and fluid glass.

However, such water jacket walls have several disadvantages. Mainly, they absorb a lot of energy and thus cause the furnace to consume a great deal of energy which, in an industrial context of energy saving, justifies in itself that the use of these water jacket walls is strictly limited to the field of rock wool production, wherein the performances of traditional refractory walls are lacking.

In addition, it should be noted that these water jacket walls have a number of additional disadvantages that are specific to a hypothetical implementation for the production of glass wool. The bath of molten raw materials required for such production has the particularity of being very light in color, hence its nickname of "clear glass" melt.

Such a clear glass melt differs from a molten rock bath by the greater intensity of radiative transfers it allows. Compared to a molten rock bath, a clear glass melt transmits more heat to the furnace walls by radiation. This further increases the energy consumption of water-jacket walls, reinforcing a disadvantage already identified as prohibitive for the use of water-jacket walls for clear glass melting.

A clear glass melt differs from a rock bath in that it is less likely to devitrify. However, in the case of a rock bath, the formation of a devitrified layer at the interface between the water-jacketed walls and the glass melt allows for better protection of these walls, in particular against corrosion induced by the rock bath. Because such a devitrified layer is more difficult to form in a clear glass melt, the water-jacketed walls are more exposed to corrosion by the glass and therefore have a reduced life span.

For these reasons at least, the use of such water-jacketed metal plates is to date considered particularly unsuitable for the production of glass wool.

The invention is intended to provide a technical solution to the disadvantages described hereinbefore. More particularly, in at least one embodiment, the proposed technique relates to an installation for melting a composition of raw materials, suitable for obtaining glass wool, textile glass yarns and/or flat glass, which comprises a melting chamber equipped with at least one submerged burner, characterized in that the melting chamber, preferentially cylindrical in shape, is defined by side walls made of refractory material in accordance with the ISO/R836 or AFNOR NF B 40-001 standards and a bare metal bottom to which said burner is attached and which is traversed by a network of pipes adapted for the circulation of a cooling fluid, preferentially water.

In the present description, the metal bottom is said to be "bare" in that it is not protected by refractory materials interposed between it and the molten glass.

Faced with the drawbacks identified in the state of the art, the inventors first launched an extensive research program in order to analyze, for different furnace configurations, the convection movements of molten glass within the furnace, the heat exchanges occurring between the molten glass and each of the elements constituting the walls, roof and bottom of the furnace, the resulting wear of each of these elements, and the energy yields obtained by the furnace for each of the envisaged configurations. These analyses were conducted both on the basis of empirical tests carried out on pilot furnaces and via computer simulations.

These analyses have shown that, in the vicinity of the burner flames, a refractory bottom wears out significantly faster than a metal bottom of the water jacket type due to the strong convection movements and the particularly high temperature of the molten glass. For reasons of durability of the bottom, and therefore of the furnace, the choice of a water-jacketed metallic bottom is therefore to be preferred.

In contrast, the furnace walls are less attacked by the molten glass than the bottom, hence the moderate wear of the refractory walls positioned there. These side walls represent a significant part of the total exchange surface of the furnace with the glass melt, also called "glass contact surface" in the following description. The use of refractories in this area, in comparison with water-jacketed metallic walls, makes it possible to limit the thermal losses and to increase the energy efficiency of the furnace, for an acceptable life span.

On the basis of these conclusions, a furnace according to the invention constitutes a hybrid solution having the advantages associated with each of the technical solutions known in the state of the art, without the disadvantages inherent therein. To do this, a furnace according to the invention skilfully combines the most efficient elements of each of these solutions in order to obtain a furnace that is both energy-efficient and durable.

It should be noted that such hybridization is by no means obvious, since it is the result of the selection and combination of elements present in technical solutions that are a priori antagonistic, on the basis of a successful research program aimed at identifying and understanding the physical mechanisms that act within the furnace and impact its energy yield and durability.

Finally, in the absence of any external incentive, the technical complexity and cost of developing a new furnace solution is an additional technical prejudice to overcome in order to achieve the invention.

According to a particular embodiment, said metal bottom is removably attached to said side walls.

Throughout the description, the term "removable" is used to describe reversible attachment, without damage to the parts fastened together. In contrast, the welding of two parts together is considered an irreversible attachment.

When servicing the furnace, the defective part alone can be replaced, while the other part can be reused. In general, this first defective part is the metal bottom since it is the one that is most intensely corroded by the liquid glass. A furnace according to the invention therefore has a significantly increased service life. The production of the bottom on the one hand, and of the side walls on the other hand is also made easier, as these two elements are produced separately and potentially, via different processes adapted to the technical specificities of each of these parts. In other words, a furnace according to the invention has improved operational efficiency.

According to a particular embodiment, said bottom comprises at least one central portion adapted to form the bottom surface of the melting chamber and a connecting flange adapted to abut flat below said side walls.

The central portion is thus adapted to be in contact with the lower part of the glass melt, while the connecting flange, formed around the perimeter of this central portion, is adapted to serve as an abutment surface with the lower part of the side walls, either by direct contact or, preferentially, through a circumferential portion of the bottom.

According to a particular embodiment, said connecting flange forms a shoulder with said central portion.

A shoulder refers to an abrupt change in cross-section formed at the base of the central portion of the bottom.

According to a particular embodiment, said bottom comprises a circumferential portion which is complementary in shape with the perimeter of said central portion and is adapted to serve as a base for said side walls on the one hand, and to be in planar abutment with said connecting flange on the other hand.

Such a circumferential portion serves as a base (or seat) for the side walls resting on it, and is preferentially integral with an external metal structure of the furnace. Note that this circumferential portion (5c) is part of the bottom and is itself water-jacketed.

The advantage of such a circumferential portion is that it favors the implementation of a hermetic connection with the sidewalls, with which it shares a planar abutment connection, whether reversible or irreversible, over a relatively large area. The risk of leakage of combustion gases is therefore reduced at this location.

This circumferential portion also facilitates the implementation of a hermetic connection with the central portion of the bottom, due to their complementary shape. Such a connection is strengthened in particular by the shared planar abutment connection with the connecting flange, which is arranged set back from the glass melt and is therefore less exposed to the heat emitted by the glass melt.

According to a particular embodiment, said circumferential portion is adapted to be removably attached to said connecting flange, preferentially by a screw-nut attachment.

When servicing the furnace, the defective part alone can be replaced, while the other part can be reused. The implementation of such a removable attachment thus makes it possible to improve the operational efficiency of the metal bottom and, more generally, that of the furnace.

According to a particular embodiment, said installation comprises at least one flue gas seal arranged at the interface between said circumferential portion and said connecting flange.

Such a seal limits the risk of gas leakage from the melting chamber to the outside of the furnace. Its arrangement between the circumferential portion and the connecting flange of the bottom is particularly advantageous in that the seal is then set back from the melting chamber and the heat it produces. The materials used for the seal can therefore be selected as having lower thermal resistance, in favor of better sealing properties.

According to a preferred embodiment, said seal is composed of a type of silicone adapted to resist high temperatures (a few hundred degrees).

According to a particular embodiment, said bare metal bottom is adapted to be traversed by at least one submerged burner and/or bubbler, which are removably attached to the bottom.

The selection of a water jacket type bottom makes it possible to limit the size, weight, and cost of the elements to be attachment to the bottom (burners, oxidant injector blocks). Indeed, the water-jacketed bottom is less thick than the refractory bottom, by a factor of 2 to 4. The elements attached under the bottom, preferentially by means of screws, must cross through it to be flush with its upper part and are therefore less voluminous, since they have a smaller thickness to cross. They are therefore less heavy and also less expensive to manufacture, given the reductions in material used, and the simplifications in design.

According to a particular embodiment, said side walls made of refractory material are at least partly covered on their perimeter with a metal mantle traversed by a network of pipes adapted for the circulation of a cooling fluid, preferentially water.

The addition of this water-jacketed metal mantle outside the furnace provides additional cooling of the refractory sidewalls and/or recovers the heat emitted through them. In some particular embodiments, it also allows the contact area of the seal to be cooled.

According to one particular embodiment, said at least one submerged burner comprises an injector block equipped with a combustion gas distribution network and a plurality of injectors.

The invention also relates to the use of such an installation for melting a composition of vitrifiable raw materials.

The combustion of a fuel in a furnace is achieved thanks to the presence in the furnace of an oxidant comprising oxygen. The use of more than 99% pure oxygen is of course a good solution for the drastic reduction of NOx since such an oxidizer is almost nitrogen-free. However, this high quality oxygen is particularly expensive.

According to a particular embodiment, the gaseous oxidant used comprises 90 to 96 mole percent oxygen and nitrogen. An industrial oxygen is used which is much less expensive and still contains some nitrogen, called "VPSA" oxygen (for "Vacuum Pressure Swing Adsorption"). The use of such a mixture is advantageous when combined with a means of reducing the combustion temperature. Indeed, due to its low concentration in the furnace, the little nitrogen introduced with the oxidizer produces little or no NOx at relatively low temperatures.

Further features and advantages of the invention will become apparent from the following description of particular embodiments, given merely as illustrative and non-limiting examples, and the appended figures, for which:

FIG. 1 is a schematic cross-sectional exploded view of an installation for melting a composition of raw materials, according to a particular embodiment of the invention, FIG. 2 is an enlarged view of the lower part of an installation such as the one shown in FIG. 1, in exploded view.

FIG. 3 is an enlarged view of the lower part of an installation such as the one shown in FIG. 1, when the bottom 3 is arranged at the bottom of the furnace.

The various elements illustrated in the figures are not necessarily shown to actual scale, the emphasis being more on representing the general operation of the invention. In the various figures, unless otherwise indicated, reference numbers that are identical represent similar or identical elements.

It is further understood that the present invention is in no way limited by the particular embodiments described and/or depicted, and that other embodiments are perfectly possible.

FIGS. 1 to 3 represent all or part of an installation 1 (furnace) for melting a composition of raw materials, and are intended to illustrate its general operation. Such an installation 1 is suitable for obtaining glass wool and/or glass textile yarns. It comprises a cylindrical melting chamber 2 oriented along a vertical axis, and is delimited by side walls 4 and a vault made of refractory materials and a bare metal bottom 5, of the water-jacket type, through which a submerged burner 3 passes.

For clarity and simplicity, the furnace 1 shown in FIGS. 1 through 3 comprises only a single burner 3, and no bubbler. It goes without saying that the scope of the invention is in no way limited by the number of burners/bubblers used in the furnace.

The furnace 1 comprises a raw material intake 8 at the bottom, located below the theoretical level of the molten raw material bath, also referred to as the glass melt in this description. The raw materials are generally fed into the melting chamber 2 by means of a feeder (not shown).

Once in the glass melt, the raw materials are melted by means of the submerged burner 3, also arranged below the level of the glass melt. In FIGS. 1 and 2, this burner 3 is presented in the form of an injector block equipped with a combustion gas distribution network and a plurality of injectors. The invention is not, however, limited to the implementation of such a type of burner which may, according to alternative embodiments, be, for example, ring-shaped and/or of the single-injector type.

The gases resulting from the combustion of the raw materials are recovered via an exhaust chimney 9 arranged in the upper part of the combustion chamber 2. The molten mixture is discharged from the furnace 1 via a weir 10 for a subsequent step of fiberizing glass wool or spinning glass textile yarns. An emergency outlet 11, located at the base of the melting chamber 2 or alternatively in the bottom, allows the furnace to be purged if necessary.

FIGS. 2 and 3 show an enlargement of the lower part of the plant, and in particular of the connections between the different components of the bottom 5 and the side walls 4 made of refractory material. The side walls 4 made of refractory material are at least partly covered on their periphery with a metal mantle 20 traversed by a network of pipes 21 adapted for the circulation of a cooling fluid, preferentially water.

According to the particular embodiment illustrated in FIGS. 2 and 3, the bottom 5 comprises in particular a central portion 5a adapted to form the lower surface of the melting chamber 2 or in other words, to form the bottom of the glass melt tank. This central portion 5a is in particular crossed by the burner 3, secured on its lower part by means of screws. A metallic circumferential portion 5c of the bottom 5 serves as a base for the side walls 4 which rest on it in a planar manner, while being integral with an external metallic structure of the furnace 1 (not shown). This circumferential portion 5c is also complementary in shape to the periphery of the central portion 5a of the base 5, so that this central portion 5a, when inserted at the base of the tank 2, closes off the central opening formed by the side walls 4, thus forming a hermetic tank bottom, at least for the passage of the molten glass, as illustrated in FIG. 3. A connecting flange 5b forms a shoulder at the base of the central portion 5a and rests flat against the lower part of the circumferential portion 5c, thus reinforcing the gas-tightness of the tank bottom, in particular by means of a seal (not shown) arranged at the interface between these two elements. According to the particular embodiment shown in FIGS. 1 to 3, the connecting flange 5b is removably attached to the circumferential portion 5c, by means of a plurality of screws. As shown in FIG. 2, at least one flue gas seal 5d is arranged at the interface between the circumferential portion and the connecting flange.

According to an alternative embodiment, not shown in the figures, the bottom 5 does not comprise a circumferential portion 5c. The bottom 5 is then attached directly to the lower part of the side walls 4, by planar contact of the connecting flange 5b with the base of the side walls, or with an intermediate plate acting as their base. Such an attachment can alternatively be reversible or irreversible.

According to an alternative embodiment, not shown in the figures, the bottom 5 comprises a circumferential portion 5c, but the latter is removably attached to the side walls 4, for example by means of a plate acting as a base for these side walls 4.

In order to evaluate the role played by the materials constituting respectively the bottom 5 and the side walls 4, on the improvement of the energy performances of the furnace 1, a test is simulated by computer via a thermal model for a furnace having a melter of 1 m², for 1 m of soda-lime glass melt at 1200° C. The surface of glass contact walls is 5 m².

For a first sample, all the walls of the furnace, including the bottom, are water-jacketed bare metal. The energy losses at the glass contact walls are then estimated at 500 kW.

In a second sample, the entire furnace wall, including the bottom, is made of refractory materials. The energy losses at the glass contact walls are then estimated at 50 kW.

It is therefore observed that the thermal losses at the walls in contact with glass are ten times higher in the case of water-jacketed walls, compared to walls made of refractory materials.

For a third sample, representative of a furnace according to the invention, the side walls are made of refractory materials, while the bottom is water-jacketed bare metal. The energy losses at the glass contact walls are then estimated at 140 KW.

Compared to the first sample, the use of the third sample, according to the claimed invention, makes it possible to limit the thermal losses and to increase significantly the energy efficiency of the furnace, for an acceptable life time, the water-jacketed bottoms being much more resistant to corrosion by glass than the refractory bottoms.

The invention claimed is:

1. An installation for melting a composition of raw materials, suitable for obtaining a glass product including a glass wool, textile glass yarns and/or flat glass, which comprises a melting chamber equipped with at least one submerged burner, wherein the melting chamber is defined by side walls made of refractory material in accordance with the ISO/R836 or AFNOR NF B 40-001 standards, the refractory material having a pyroscopic resistance equivalent to at least 1500° C., and a bare metal bottom to which said at least one submerged burner is attached and which is traversed by a network of pipes adapted for the circulation of a cooling fluid, wherein said bare metal bottom is removably attached to said side walls, wherein said bare metal bottom is adapted to be traversed by the at least one submerged burner, which is removably attached to the bare metal bottom, and wherein said bare metal bottom includes a circumferential metal portion arranged in the side walls made of refractory material and a central metal portion that is removably positioned against the circumferential metal portion, wherein the central metal portion is positioned against the circumferential metal portion when the bare metal bottom is attached to the side walls and the central metal portion is separated from the circumferential metal portion when the bare metal bottom is detached from the side walls.

2. The installation according to claim 1, wherein said bare metal bottom comprises a connecting flange adapted to abut flat below said side walls.

3. The installation according to claim 2, wherein said connecting flange forms a shoulder with said central metal portion.

4. The installation according to claim 3, wherein a wall formed by the shoulder is positioned against one of the side walls of the melting chamber when said bare metal bottom is attached to the side walls.

5. The installation according to claim 2, wherein said circumferential metal portion is complementary in shape to the perimeter of said central metal portion and is adapted to serve as a base for said side walls, and to be flush with said connecting flange.

6. The installation according to claim 5, wherein said circumferential metal portion is adapted to be attached to said connecting flange in a removable manner.

7. The installation according to claim 6, wherein said circumferential metal portion is adapted to be attached to said connecting flange by a screw-nut attachment.

8. The installation according to claim 5, comprising at least one combustion gas seal arranged at the interface between said circumferential metal portion and said connecting flange.

9. The installation according to claim 1, wherein said bare metal bottom is adapted to be traversed by a bubbler, which is removably attached to the bare metal bottom.

10. The installation according to claim 1, wherein said side walls made of refractory material are at least partly covered on their periphery with a metal mantle traversed by a network of pipes adapted for the circulation of a cooling fluid.

11. The installation according to claim 10, wherein said cooling fluid that circulates in the network of pipes that traverse the metal mantle is water.

12. The installation according to claim 1, wherein said at least one submerged burner comprises an injector block equipped with a combustion gas distribution network and a plurality of injectors.

13. The installation according to claim 1, wherein the melting chamber is cylindrical in shape.

14. The installation according to claim 1, wherein the cooling fluid is water.

15. A method comprising melting a composition of vitrifiable raw materials with an installation according to claim 1.

* * * * *